United States Patent
Raghunathan et al.

(10) Patent No.: US 9,226,115 B2
(45) Date of Patent: Dec. 29, 2015

(54) CONTEXT-AWARE IN-VEHICLE DASHBOARD

(71) Applicants: Sriraman Kandhadai Raghunathan, Bangalore (IN); Aswath Premaradj, Pondicherry (IN)

(72) Inventors: Sriraman Kandhadai Raghunathan, Bangalore (IN); Aswath Premaradj, Pondicherry (IN)

(73) Assignee: Wipro Limited, Bangalore (IN)

( * ) Notice: Subject to any disclaimer, the term of this patent is extended or adjusted under 35 U.S.C. 154(b) by 197 days.

(21) Appl. No.: 13/964,443

(22) Filed: Aug. 12, 2013

(65) Prior Publication Data
US 2014/0375447 A1    Dec. 25, 2014

(30) Foreign Application Priority Data
Jun. 20, 2013    (IN) .......................... 2682/CHE/2013

(51) Int. Cl.
| | | |
|---|---|---|
| *B60Q 1/00* | (2006.01) | |
| *G08B 7/00* | (2006.01) | |
| *G08B 5/00* | (2006.01) | |
| *G06F 3/048* | (2013.01) | |
| *H04W 4/04* | (2009.01) | |
| *H04L 29/08* | (2006.01) | |
| *H04L 12/40* | (2006.01) | |

(52) U.S. Cl.
CPC .............. *H04W 4/046* (2013.01); *H04L 67/10* (2013.01); *H04L 2012/40215* (2013.01); *H04L 2012/40273* (2013.01)

(58) Field of Classification Search
CPC ...................................................... B60Q 3/04
See application file for complete search history.

(56) References Cited

U.S. PATENT DOCUMENTS

| | | | |
|---|---|---|---|
| 5,534,759 A | 7/1996 | Evans et al. | |
| 5,844,505 A | 12/1998 | Van Ryzin | |
| 6,055,478 A | 4/2000 | Heron | |
| 6,175,789 B1 | 1/2001 | Beckert et al. | |
| 6,253,122 B1 | 6/2001 | Razavi et al. | |
| 6,434,459 B2 | 8/2002 | Wong et al. | |
| 6,812,851 B1 * | 11/2004 | Dukach et al. ............. | 340/815.4 |
| 6,944,679 B2 | 9/2005 | Parupudi et al. | |
| 7,363,357 B2 | 4/2008 | Parupudi et al. | |
| 7,472,202 B2 | 12/2008 | Parupudi et al. | |
| 7,529,854 B2 | 5/2009 | Parupudi et al. | |
| 7,683,771 B1 | 3/2010 | Loeb | |
| 2002/0120370 A1 | 8/2002 | Parupudi et al. | |
| 2007/0101290 A1 * | 5/2007 | Nakashima et al. .......... | 715/797 |

FOREIGN PATENT DOCUMENTS

WO    WO 00/77620    12/2000

\* cited by examiner

*Primary Examiner* — Jennifer Mehmood
*Assistant Examiner* — John Mortell
(74) *Attorney, Agent, or Firm* — Finnegan, Henderson, Farabow, Garrett & Dunner, LLP

(57) ABSTRACT

Context-aware in-vehicle dashboard systems and methods are disclosed. Said systems and methods are capable of determining vehicle states and context using a variety of both vehicle-based and non-vehicle based data sources, and adapting to different vehicle states. Systems and methods in accordance with the present disclosure may be capable of presenting different information and/or notifications based on the vehicle state and the category/priority of the information and/or notifications.

13 Claims, 3 Drawing Sheets

CONTEXT-AWARE IN-VEHICLE DASHBOARD

RELATED APPLICATIONS

This application claims priority under 35 U.S.C. §119 to Indian Application 2682/CHE/2013 filed Jun. 20, 2013. The aforementioned application is incorporated herein by reference in its entirety.

TECHNICAL FIELD

The disclosure generally relates to vehicle dashboard systems, instrument clusters, central consoles, and alternatives thereto.

BACKGROUND

Automobiles and other vehicles (such as aerospace and marine vehicles) employ dashboards and instrument clusters having a number of mechanical parts, including various analog instruments, meters, complex wiring mechanisms, circuit boards, etc. which are assembled together. These largely mechanical dashboards thus require intricate installation and servicing requirements, and each mechanical component suffers from gradual, inevitable wear and tear that may necessitate their replacement.

Vehicle dashboards and instrument clustered are typically arranged near the driver's side of the vehicle. However, the driver is still often required to interact with the vehicle's central console in order to access certain vehicle functions such as control of the internal environment (e.g. cabin temperature), navigation systems, audio/video playback devices, etc. The position of the central console is typically aligned with the vehicle's midline. The central console thus presents a continuing distraction to driving and may also be inconvenient for the driver to access. Like vehicle dashboards, central consoles also include mechanical components which require installation and replacement due to inevitable wear and tear.

Thus, systems and methods which are context-aware, capable of adapting to different vehicle states, and/or capable of merging critical or high priority vehicle-related information sources with non-critical or low priority non-vehicle-related information sources while at the same time enhancing safety are needed.

DESCRIPTION

The present disclosure relates to a dashboard for a vehicle comprising: a primary display area; a secondary display area; and one or more hardware processors, wherein the one or more hardware processors are in communication with the primary display area and the secondary display area, and wherein the one or more hardware processors are configured to: (A) determine whether the vehicle is in motion, stationary in traffic, or stationary in park based on at least one of: a vehicle's engine state, a vehicle's speed, a proximity of the vehicle to a traffic signal junction; a proximity of the vehicle to a parking lot, or a vehicle's gear state; (B) receive a notification request containing a notification from an application being executed by the one or more hardware processors; (C) provide the notification using at least one of the primary display area or the secondary display area based on (I) the determination of whether the vehicle is in motion, stationary in traffic, or stationary in park; and (II) a categorization of the application; and (D) prioritize execution of the application by the one or more hardware processors based on the categorization of the application.

In certain embodiments, determining whether the vehicle is in motion, stationary in traffic, or stationary in park comprises using one or more context-determination algorithms executed on the one or more hardware processors. In certain embodiments, two or more context-determination algorithms are used and each context-determination algorithm individually determines whether the vehicle is in motion, stationary in traffic, or stationary in park based on at least one of a vehicle's engine state, a vehicle's speed, a proximity of the vehicle to a traffic signal junction; a proximity of the vehicle to a parking lot, or a vehicle's gear state; and the one or more hardware processors are configured to determine whether the vehicle is in motion, stationary in traffic, or stationary in park by weighting the determination of each context-determination algorithm.

In certain embodiments, the primary display area and the secondary display area are integrated into a single display device.

In certain embodiments, the one or more hardware processors are further configured to receive input from a driver using one or more input devices, wherein the one or more input devices include at least one of: a touch-sensitive surface, a motion-sensing detector, a microphone, a keyboard, a touch-screen keyboard, and a pointing device. The one or more hardware processors may be configured to process input from the microphone using a natural-language processing algorithm. The one or more hardware processors may be configured to disable one or more input devices when the vehicle is in motion.

In certain embodiments, the one or more hardware processors may be configured to determine whether the vehicle is in motion, stationary in traffic, or stationary in park using one or more on-board sensors, wherein the one or more on-board sensors include at least one of: an accelerometer, a gyroscope, a speedometer, or a GPS.

In certain embodiments, the one or more hardware processors are configured to provide the notification using the primary display area when (I) the one or more hardware processors determine that the vehicle is in motion and (II) the application is categorized as a high priority application. The one or more hardware processors may provide the notification using the secondary display area when (I) the one or more the one or more hardware processors determine that the vehicle is stationary in park and (II) the application is categorized as an intermediate or low priority application.

In certain embodiments, the one or more hardware processors are further configured to: determine whether the application has been associated with the primary display area or the secondary display area; and save the association to a remote storage device when the application has been associated with the primary display area or the secondary display area. Determining whether the application has been associated with the primary display area or secondary display area may include determining whether the association has been saved to the remote storage device.

The present disclosure also relates to a non-transitory computer-readable medium storing instructions for providing a dashboard for a vehicle having a primary display area and a secondary display area, wherein execution of the instructions by one or more hardware processors causes the one or more hardware processors to: (A) determine whether the vehicle is in motion, stationary in traffic, or stationary in park based on at least one of: a vehicle's engine state, a vehicle's speed, a proximity of the vehicle to a traffic signal junction, a proximity of the vehicle to a parking lot, or a vehicle's gear state; (B) receive a notification request containing a notification from an application being executed by the one or more hardware processors; (C) provide the notification using at least one of the primary display area or the secondary display area based on (I) the determination of whether the vehicle is in motion, stationary in traffic, or stationary in park; and (II) a categorization of the application; and (D) prioritize execution of the application by the one or more hardware processors based on the categorization of the application.

Additional objects and advantages of the present disclosure will be set forth in part in the description which follows, and in part will be obvious from the description, or may be learned by practice of the invention. The objects and advantages of the present disclosure will be realized and attained by means of the elements and combinations particularly pointed out in the appended claims.

The accompanying drawings, which are incorporated in and constitute a part of this specification, illustrate embodiments of the present disclosure and together with the description, serve to explain the principles of the present disclosure.

DETAILED DESCRIPTION

As used herein, reference to an element by the indefinite article "a" or "an" does not exclude the possibility that more than one of the element is present, unless the context clearly requires that there is one and only one of the elements. The indefinite article "a" or "an" thus usually means "at least one." The disclosure of numerical ranges should be understood as referring to each discrete point within the range, inclusive of endpoints, unless otherwise noted.

As used herein, "vehicles" may include automobiles, boats, airplanes, trailers, buses, trains, trucks, etc. and may generally refer to any mode of conveyance of persons and/or objects. Certain embodiments of the present disclosure may be directed to particular vehicles, e.g. automobiles.

Figure 1:
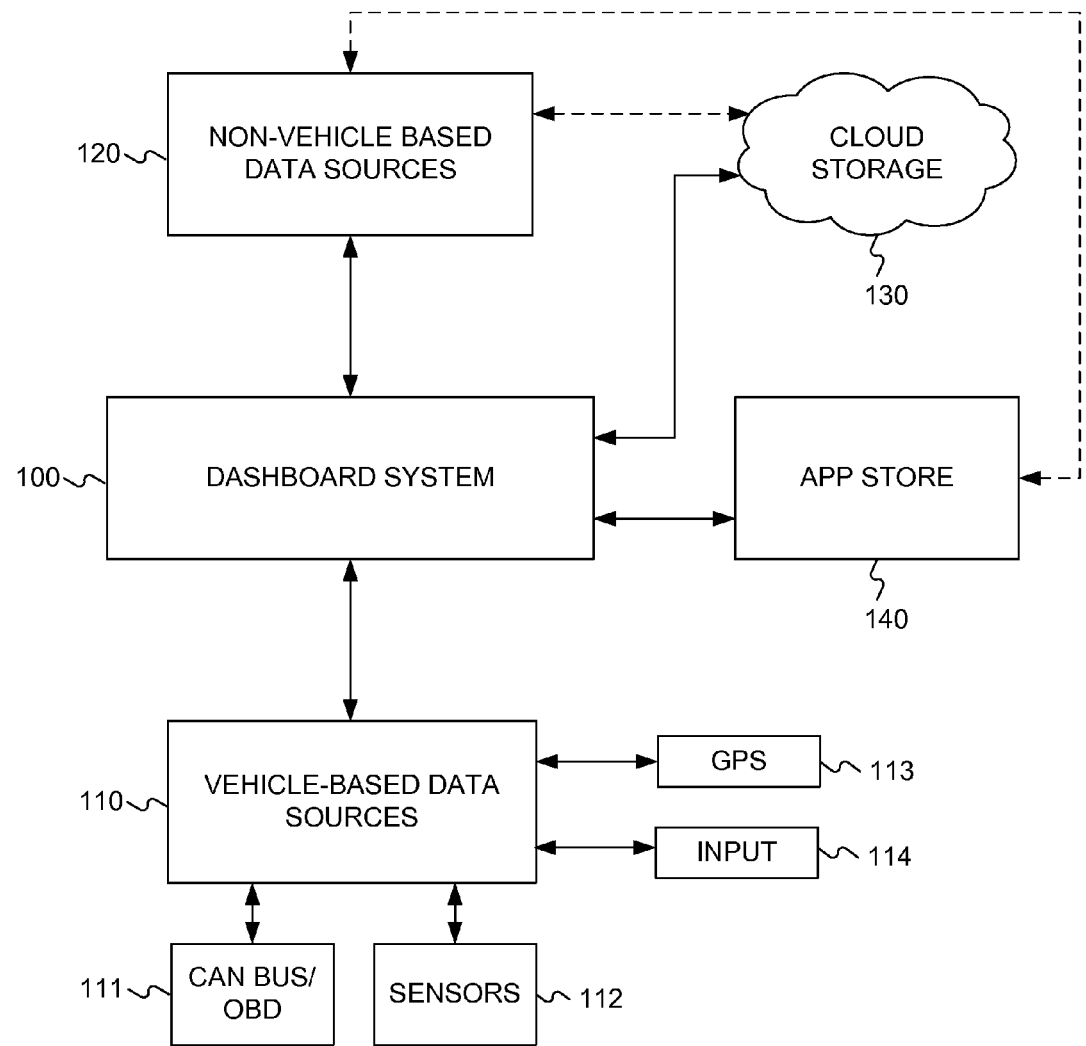
FIG. 1 is a block diagram of a high-level system architecture including a dashboard system 100 in accordance with an exemplary embodiment of the present disclosure.

FIG. 1 is a block diagram of a high-level system architecture including dashboard system 100 in communication with various data sources. As shown in FIG. 1, these data sources may include vehicle-based data sources 110, such as a vehicle controller area network (CAN) bus or on-board diagnostic (OBD) sensors, and non-vehicle-based data sources 120, such as Internet-based data sources. Dashboard system 100 may also be in communication with cloud storage 130 and an app store 140. Both the cloud storage 130 and the app store 140 may be accessed via the same or different protocols as the non-vehicle-based data sources. For example, as shown by the dotted lines in FIG. 1, the cloud storage 130 and the app store 140 may communicate with the dashboard system 100 using the same communication protocols as the non-vehicle based data sources such as, for example, internet-based data sources.

The vehicle-based data sources 110 may provide information regarding the vehicle's operating state using on-board sensors, including those available through a vehicle's CAN bus/OBD sensors 111, other on-board sensors 112, on-board GPS devices 113, and/or on-board input devices 114. The vehicle-based information may comprise parameters including the vehicle's speed, acceleration, engine RPM, engine temperature, fuel level, fuel range, battery level, battery temperature, gear, oil level, wiper-fluid level, windshield-wiper state, location (e.g. GPS coordinates), cabin temperature, external temperature, headlight status, mileage, tire pressure, etc. These parameters may be obtained by the dashboard system 100 via the on-board vehicle CAN bus or through equivalent means (e.g. a vehicle-based network, and other communication protocols such as radio, satellite, USB, Bluetooth, LAN, WLAN, WAN, 3G/4G/LTE, etc.). Other on-board sensors 112 may include accelerometers, gyroscopes, speedometers, etc. In certain exemplary embodiments, the dashboard system 100 may communicate with the vehicle-based data sources via the vehicle CAN bus or equivalent hardwired communication links. The vehicle-based data sources 110 may also include one or more on-board input devices 114 for the dashboard system 100 that allow for user interaction, such as an interaction between the dashboard system 100 and a driver or other vehicle passenger. The one or more input devices 114 may include, for example, a keyboard, a mouse, a microphone, a touch-sensitive surface (e.g. a resistive or capacitive touchscreen), motion-sensing detectors (e.g. gesture-based input devices), and the like. The vehicle-based data sources 110 may also communicate with local devices such a driver's smartphone or other computing device to provide, for example, phone dialing and SMS/MMS capability.

The non-vehicle-based data sources 120 may provide information from external data sources and third-party content providers. Such information may include, for example, navigation information (e.g. maps, route guidance, points of interest (POI) etc.), weather information, traffic information, and the like. Applications being executed by the dashboard system 100 may also be provided access to non-vehicle-based data sources 120. The dashboard system 100 may communicate with the non-vehicle-based data sources 120 using various communication protocols, such as radio, satellite, USB, Bluetooth, LAN, WLAN, WAN, 3G/4G/LTE, etc. Certain non-vehicle-based data sources 120 may be accessed using Internet communication protocols. Thus, in certain exemplary embodiments, the dashboard system 100 may communicates with the non-vehicle-based data sources 120 using wireless communication protocols capable of accessing the Internet.

The dashboard system 100 may communicate with both cloud storage 130 and app store 140 using, for example, the same protocols used to communicate with the non-vehicle-based data sources 120. Dashboard system 100 may also communicate using different protocols than that used to communicate with the non-vehicle-based data sources 120. Cloud storage 130 may provide remote non-volatile data storage for the dashboard system 100. In certain embodiments, cloud storage 130 may be used by the dashboard system 100 as remote backup storage, and data stored locally by the dashboard system 100 may be synchronized to cloud storage 130. Synchronization may occur periodically or continuously as the dashboard system writes data to its local storage. App store 140 may provide access to third-party applications capable of being executed by the dashboard system 100. Certain functionalities of the dashboard system 100, discussed below, may be exploited by third-party applications using an application programming interface (API).

Figure 2:
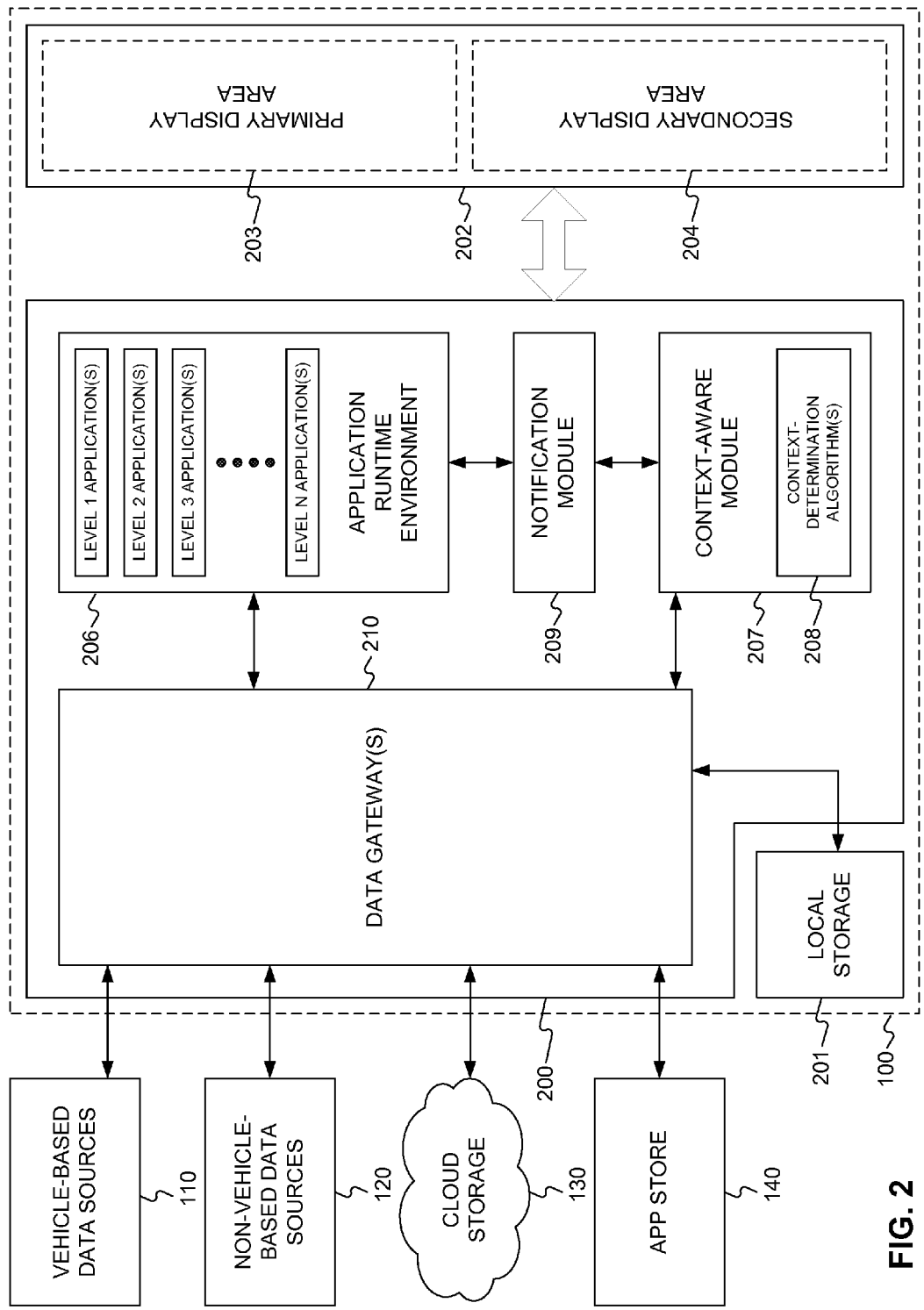
FIG. 2 is block diagram including a depiction of an exemplary embodiment of the dashboard system 100, in accordance with an exemplary embodiment of the present disclosure.

FIG. 2 is a block diagram including a depiction of an exemplary embodiment of the dashboard system 100, in accordance with an exemplary embodiment of the present disclosure. As shown in FIG. 2, the dashboard system 100 may comprise a dashboard operating system 200, a local storage device 201, and a display 202. The dashboard operating system 200 may be executed by one or more hardware processors (not shown); the one or more hardware processors may constitute a part of the dashboard system 100.

The display 202 may comprise a primary display area 203 and a secondary display area 204. In certain embodiments, the display may be a single display having a single contiguous display area. In these embodiments, the primary display area 203 and the secondary display area 204 correspond to different spatial areas of the single contiguous display area, and the display 202 may be arranged in the vehicle such that the single contiguous display area extends from the driver's side of the vehicle to any point either on the driver's side or the passenger's side of the vehicle. For example, the single contiguous display area may extend from the driver's side of the vehicle to just beyond the vehicle's centerline.

In other embodiments, the display 202 may comprises one or more contiguous display areas and/or one or more displays. In these embodiments, contiguous display areas may be arranged in different locations within the vehicle. Thus, in addition to the arrangement described in the previous embodiment, where a contiguous display area may extend from the driver's side of the vehicle to a point before or to the passenger's side of the vehicle, another exemplary contiguous display area may be placed on the front of the steering wheel. Where the display 202 comprises one or more contiguous display areas and/or one or more displays, the primary display area 203 and the secondary display area 204 may correspond to different spatial areas of the one or more contiguous display areas and/or one or more displays. Thus the primary display area 203 may correspond to the contiguous display area on the front of the steering wheel and the portion of the contiguous display area extending from the driver's side of the vehicle to the passenger's side of the vehicle closer to the driver's side, while the secondary display area 204 may correspond of the portion of the contiguous display area extending from the driver's side of the vehicle to the passenger's side of the vehicle closer to the passenger's side. In certain exemplary embodiments, the primary display area 203 and the secondary display area 204 may correspond to mutually exclusive display areas of the display 202. In other exemplary embodiments, primary display area 203 and secondary display area 204 may correspond to overlapping display areas of the display 202.

The display 202 may include one or more light-emitting diode (LED) displays, liquid crystal displays (LCD), and/or organic light-emitting diode displays (OLED). The display 202 may include a touch-sensitive surface such that one or more contiguous display areas, including one or more of the primary display area 203 and the secondary display area 204, may facilitate tactile or gesture input from a user and/or driver. Thus the dashboard system 100 may receive tactile or gesture input from display 202 in addition to the one or more input devices 114. In certain embodiments, the one or more input devices 114 includes a microphone that allows the dashboard system to receive voice or audio input from a user—the voice or audio input may be processed using natural-language processing algorithms being executed on the one or more hardware processors. Thus, in certain embodiments in accordance with the present disclosure, the dashboard system 100 may be capable of receiving both voice or audio and tactile/gesture input. The dashboard system 100 may also be integrated in the vehicle's audio system and thereby provide audio output. Alternatively, the dashboard system 100 may comprise one or more audio output devices, e.g. speakers, for providing audio output.

The local storage device 201 may provide a hardware memory for storing data needed by dashboard operating system 200. Thus the local storage device 201 may comprise a non-transitory computer-readable medium storing instruction that when executed by one more hardware processors, carry out of the functionalities of the dashboard operating system 200 discussed herein. Data stored on the local storage device 201 may be replicated in cloud storage 130 for backup purposes. For example, an application executed by the dashboard operating system 200 on the one or more hardware processors may periodically or continuously synchronize the data stored in the local storage device 201 with cloud storage 130. Exemplary embodiments of the local storage device 201 may include, for example, a hard disk drive, a solid-state drive (SSD), a flash memory, etc.

The dashboard operating system 200 may comprise one or more data gateways 210, an application runtime environment 206, a context-aware module 207, and a notification module 209. The one or more data gateways 210 provide a software-hardware interface for various data sources, e.g. the vehicle-based data sources 110, the non-vehicle based data sources 120, cloud storage 130, and app store 140. Various communication protocols may be employed by the one more data gateways 210, e.g. connection to the vehicle CAN bus, a vehicle-based network, and any other communication protocols such as radio, satellite, USB, Bluetooth, LAN, WLAN, WAN, 3G/4G/LTE, etc.

The application runtime environment 206 of the dashboard operating system 200 may execute one or more applications that implement the functionalities of the dashboard system 100. The one more applications may include a virtual dashboard that uses the display 202 to graphically depict vehicle-related information. Examples of vehicle-related information include information regarding the state of the vehicle including, for example, speed, mileage, engine temperature, engine maintenance state, trip mileage, engine RPM, oil level, battery level, battery temperature, battery temperature, range, etc. The virtual dashboard application may use display 202 to provide vehicle-related information using graphical elements and/or a graphical user interface (GUI) that simulate mechanical and/or analog dashboards and instrument clusters such as, for example, speedometers, odometers, fuel gauges, mileage counters, oil light indicators, engine light indicators, gear indicators, head light indicators, turn signal indicator, etc. Thus, for example, the virtual dashboard application may monitor the speed of a vehicle by requesting or being provided with the vehicle's speed from a vehicle-based data source 110 (e.g. an on-board sensor measuring the vehicle's speed) via the one or more data gateways 210; the virtual dashboard may then provide a graphical simulation of a speedometer using display 202 to provide information regarding the vehicle's speed. The application runtime environment 206 may also execute applications approximating the functionality of vehicle central consoles, such as, for example, a clock, a temperature control dial, a fan level switch, an air conditioning on/off toggle, an emergency/hazard light on/off toggle, a fuel efficiency indicator, a GPS navigation display and/or interface, a radio station dial, a volume dial, CD/MP3/audio player display and/or interface, a DVD/video player display and/or interface, etc. The application runtime environment 206 may also execute other applications, including apps obtained from app store 140, including, for example, social media applications, location-based service applications, digital assistant applications (e.g. a context-aware digital assistant application), web browsing applications, document processing applications (e.g. word processing applications, spreadsheet applications, e-mail applications, etc.), entertainment applications (e.g. game applications), media player applications, etc.

Applications executed by the application runtime environment 206 may be categorized according to various parameters. In certain embodiments, the categorization of applications executed by runtime environment 206 comprises assigning a priority to the applications relevant to the safe operation of a vehicle. Thus, for example, information regarding a vehicle's speed should be provided in an accurate and real-time manner in order to ensure that a driver is capable of obeying relevant traffic laws, and safely operating the vehicle. On the other hand, other applications, e.g. a media player application showing a movie, may be considered to have only tangential relation to the safe operation of a vehicle. Dashboard 100 may therefore provide that the execution of applications critical to the safe operation of a vehicle take precedence over the execution of less critical applications. Thus, as shown in FIG. 2, application runtime environment 206 may be subdivided into multiple application runtime environments having varying priorities of execution. Applications running in an application runtime environment having a higher priority of execution may be given prioritized execution by using various hardware- and/or software-based techniques, for example, processor affinity (e.g. granting processor affinity), memory or storage allocation optimization (e.g. allocating memory or storage in contiguous regions), multi-threading (e.g. allowing an application to execute using multiple process threads), CPU scheduling (e.g. providing more CPU cycles to the application), etc. Applications capable of being executed by the dashboard operating system 200 may also be provided with a predefined priority, e.g. high-priority, intermediate priority, or low priority; based on the predefined priority, the dashboard operating system 200 may launch the application in the appropriate application runtime environment.

Thus, in certain exemplary embodiments of the present disclosure, applications may be assigned a high priority (a "Level 1 application"), intermediate priority (a "Level 2 application"), or low priority (a "Level 3 application"). Additionally, application runtime environment 206 may be subdivided into a Level 1 application runtime environment, a Level 2 application runtime environment, and a Level 3 application runtime environment. As shown in FIG. 2, additional subdivisions and application priorities may be used (for example, a "Level N application" may be assigned to a Level N application runtime environment). Level 1 application may be granted processor affinity, multithreaded execution permission, and optimized memory/storage allocation, while Level 2 applications may be provided with multithreaded execution permission and Level 3 applications are given no hardware- or software-based prioritization. Applications providing vehicle-related information, e.g. the virtual dashboard application, may be executed in the Level 1 application runtime environment, while a GPS navigation application may be executed in a Level 2 application runtime environment and a social media application may be executed in a Level 3 application runtime environment. While the exemplary embodiment described herein describes 3 priority levels, any number of priority levels may be used.

Prioritization (categorization) of applications capable of being executed by the dashboard operating system 200 may be provided using app store 140. App store 140 may provide a "closed development ecosystem" that allows developers to create applications using an application programming interface (API). The API exposes certain functionalities of dashboard system 100 including access to vehicle on-board data sources 110 (via, e.g., one or more data gateways 210) and display 202. An app created using the API may be prioritized, for example, based on the API functionalities embedded the app. For example, a developer may develop a speedometer app that uses API subroutines that obtain a vehicle's speed from a vehicle-based data source 101 (e.g. an on-board sensor measuring the vehicle's speed) via the one or more data gateways 210, and display the vehicle's speed using display 202. Based the app's use of these API functionalities, the app store 140 may categorize the speedometer app as a high priority application, e.g. a Level 1 application. Alternatively, app store 140 may allow priority to be assigned to an application at the time the app is approved for distribution via app store 140.

Applications being executed by the dashboard operating system 200 in the application runtime environment 206 may display a persistent GUI using display 202. In certain embodiments, the persistent GUI is displayed in either the primary display area 203 or the secondary display area 204 based on the categorization or priority of the application, the runtime environment, and/or the state of the vehicle. Thus, a Level 1 application providing information regarding the vehicle, e.g. a speedometer application, may provide a persistent GUI display using the primary display area 203, while a Level 3 application providing a social media interface may provide a persistent GUI display using the secondary display area 204. A user may customize the appearance of the display, for example by requesting an application display a persistent GUI on the primary display area 203 or the secondary display area 204—the ability of the user to customize the location of persistent GUI may be restricted such that certain applications, e.g. applications having distracting visual elements, applications requiring constant user input, etc., may not be made available in the primary display area 203. Thus, in certain embodiments, only applications that are considered safe and non-distracting may be displayed in the primary display area 203, while applications relevant to safe vehicle operation may not be removed from the primary display area 203 or moved to, for example, the secondary display area 204. Where an application may be displayed may also depend on the vehicle context—thus certain applications may be displayed in certain areas, e.g. the primary display area 203 when the vehicle is stationary in park, but not when the vehicle is in motion and/or stationary in traffic.

Applications being executed by the dashboard operating system 200 in the application runtime environment 206 may provide a notification regarding, for example, a real-time event such as traffic congestion update, a weather update or other weather advisory, an excess speed notification, a service warning or update (e.g. a reminder regarding an oil change, engine service, tire rotation/pressure, etc.), a social media update, a SMS/MMS/email or other personal communication, and advertisement/promotional material etc. The notification may be provided using display 202, for example using the primary display area 203, the secondary display area 204, and/or one or more notification regions (not shown in FIG. 2), which may overlap or be contiguous with the primary display area 203 and/or secondary display area 204. The dashboard operating system 200 may decide, via for example notification module 209, whether to display the notification and/or where to display the notification (e.g. using the primary display area 203, the secondary display area 204, and/or a notification region) based on the categorization/prioritization of the application and a determination from context-aware module 207 regarding the state of vehicle as in motion, stationary in traffic, or stationary in park. In certain embodiments, notifications may be provided using only the primary display area 203. In other embodiments, notifications may be displayed using both the primary display area 203 and the secondary display area 204, for example, using one or more notification regions.

Figure 3:
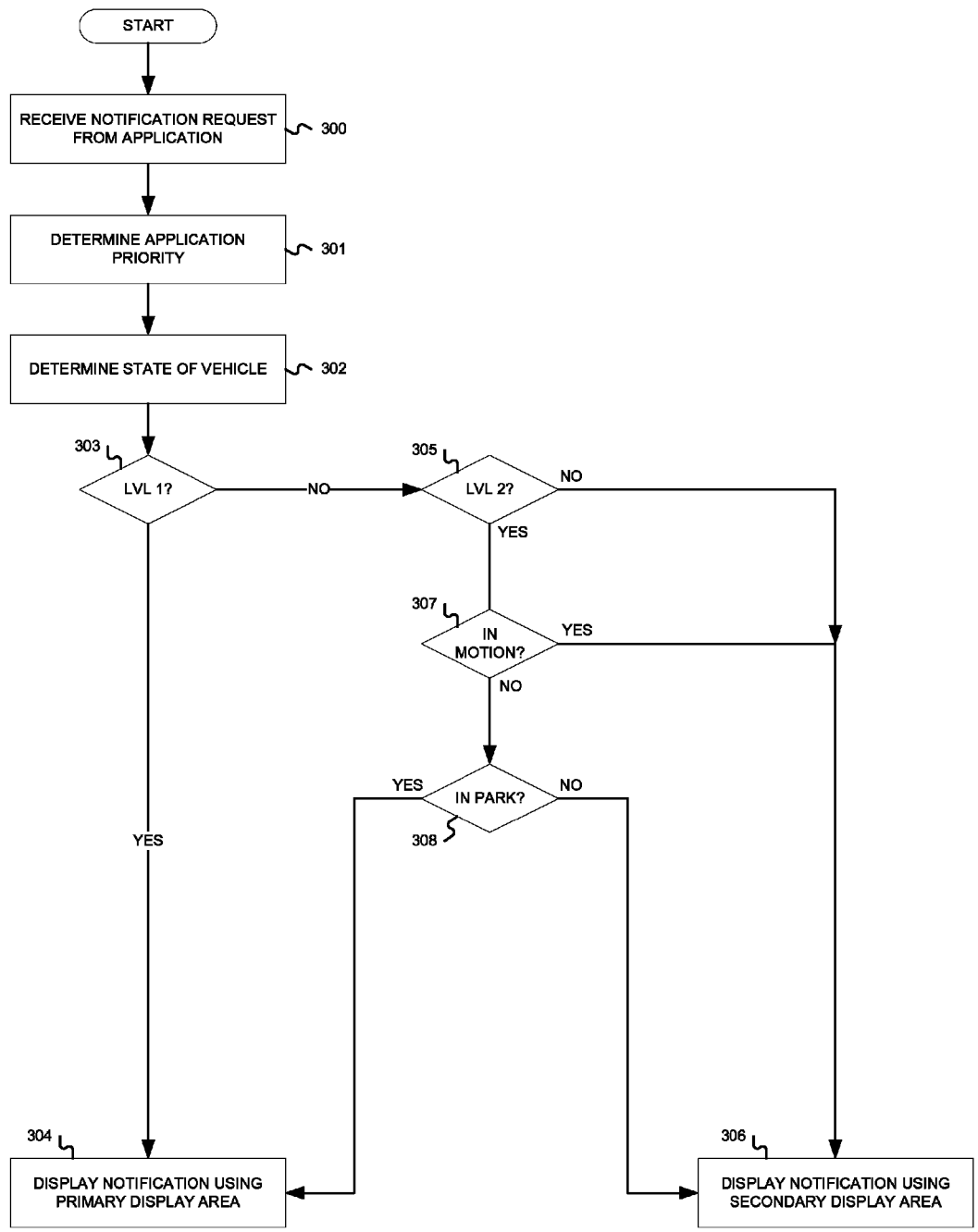
FIG. 3 is a flow diagram for providing an exemplary notification using the dashboard system 100 in accordance with an exemplary embodiment of the present disclosure.

FIG. 3 provides a flow diagram for an exemplary method by which dashboard system 100 may provide a notification from an application being executed by the dashboard operating system 200 to the driver. Because notifications may distract the driver, dashboard system 100 may determine whether and/or where to display a notification based on, for example, the priority of the application providing the notification, and the state of the vehicle. In the exemplary method shown in FIG. 3, in step 300, notification module 209 may receive a notification request from an application being executed in the application runtime environment 206. In step 301, the notification module 209 may determine the priority (categorization) of the application originating the request, e.g. a Level 1 application, a Level 2 application, or a Level 3 application, as discussed above. Determining the priority of the application may use, for example, metadata associated with the notification request. After determining the application priority, the state of the vehicle may be determined in step 302, e.g. determining the state of the vehicle as either in motion, stationary in traffic, or stationary in park. In certain embodiments, context-aware module 207 may determine the state of the vehicle and push the information to notification module 209; notification module 209 may request or otherwise receive the state of the vehicle from context-aware module 207. Context-aware module 207 may use one or more context-determination algorithms 208 to determine the state of the vehicle. In this embodiment, the notification module 209 may determine whether to display the notification in either the primary display area 203 or the secondary display area 204 based on 1) the application priority, 2) the state of the vehicle. For example, based on the determination of the application priority in step 301, if the notification originates from a Level 1 application (step 303; YES), notification module 209 may provide the notification to the primary display area 203 (step 304), regardless of whether the vehicle is in motion, stationary in traffic, or stationary in park. If the application is not a Level 1 application (step 303; NO), then notification module 209 may determine if the application priority is Level 2 in step 305. If the application is not a Level 2 application (step 305; NO), then in this exemplary embodiment, the application must be a Level 3 application, and notification is provided using the secondary display area (step 306). However, if the application is a Level 2 application (step 305; YES), notification module 209 uses the determination of the vehicle state in step 302 to determine if the vehicle is in motion (step 307). If so (step 307; YES), then notification module 209 provides the notification using the secondary display area 204 (step 306). If the vehicle is not in motion (step 307; NO), then notification module 209 may determine, based on the determination of the vehicle state in step 302, whether the vehicle in stationary in park (step 308). If the vehicle is stationary in park (step 308; YES), then notification module 209 may provide the notification using the primary display area 203 (step 304). If the vehicle is not stationary in park (step 308; NO), then in this embodiment the vehicle state is stationary in traffic and the notification is provided using the secondary display area (step 306). Other The context-aware module 207 may determine the state of the vehicle using one or more context-determination algorithms 208. In addition to being used by the context-aware module 207, the one or more context-determination algorithms 208 may also be exposed as part of the API, thus allowing third-party applications to be contextually customized. The one or more context-determination algorithms may determine vehicle context based on parameters obtained from the vehicle-based data sources 110 and/or non-vehicle-based data sources 120. A context-determination algorithm 208 may comprise determining one or more parameters using the vehicle-based data sources 110 and/or non-vehicle-based data sources 120, and determining whether the vehicle is in motion, stationary in park, or stationary in traffic based on the determined parameters. Thus, one embodiment of a context-determination algorithm 208 comprises determining the vehicle engine state as on or off and determining the speed of the vehicle using, for example, a speedometer. For example, if the vehicle engine state is on and the speed of the vehicle is greater than about zero, then the vehicle is in motion; if the vehicle engine state is on and the speed of the vehicle is about zero, then the vehicle is stationary in traffic; if the vehicle engine is off with the vehicle gear state in park, then the vehicle is stationary in park. Another embodiment of a context-determination algorithm 208 comprises determining the vehicle gear state (e.g., in park or in drive) and determining the speed of the vehicle using, for example, a speedometer: if the vehicle gear state is in park, then the vehicle is stationary in park; if the vehicle gear state is in drive and the speed of the vehicle is greater than about zero, then the vehicle is in motion; if the vehicle gear state is in drive and the speed of the vehicle is about zero, then the vehicle is stationary in traffic. Another embodiment of a context-determination algorithm 208 comprises determining the vehicle's engine state as on or off, determining the speed of the vehicle using, for example, a speedometer, and determining the proximity of the vehicle to the closest traffic junction by determining the location of the vehicle using, for example, GPS, and the location of one or more nearby traffic junctions using, for example, a non-vehicle-based data source 120 providing navigation information. For example, if the vehicle engine is off with the vehicle gear state in park, then the vehicle is stationary in park; if the vehicle engine is on, and the speed of the vehicle is greater than about zero, then the vehicle is in motion; if the vehicle engine is on and the speed of the vehicle is about zero and the vehicle is far away from the closest traffic junction, (e.g., further than about 100 meters from the closest traffic junction) then the vehicle is stationary in park; if the vehicle engine is on and the speed of the vehicle is about zero and the vehicle is near the closest traffic junction (e.g., less than about 100 meters from the closest traffic junction), then the vehicle is stationary in traffic. Other embodiments of context determination algorithms may use information regarding a driver's historical driving behavior, information regarding a driver's personal schedule, information obtained from a driver's social media profiles, information regarding a GPS route guidance, etc.

Context-aware module 207 may employ one or more context-determination algorithms 208 to determine the state of the vehicle. In the case where context-aware module 207 employs more than one context-determination algorithm 208 (e.g., 2 to 100 context-determination algorithms), the accuracy of the determination may be enhanced. For example, context-aware module 207 may determine that a vehicle is stationary in park only if a majority or plurality of the context-determination algorithms 208 determines that the vehicle is stationary in park. The context-aware module may also weight the determinations of the context-determination algorithms 208 such that determinations received from certain context-determination algorithms 208 are accorded more significance. For example, context-aware module 207 may employ N context-determination algorithms 208—$C_1$, $C_2$, $C_3$, ... $C_i$, ... $C_N$—which determine the state of a vehicle as either in motion, stationary in traffic, or stationary in park. These vehicle states may correspond to output vectors V having value of <1, 0, 0>, <0, 1, 0>, or <0, 0, 1>, with respect to the three exemplary states; context-determination algorithms 208 $C_1$ to $C_N$ may output state vectors $V_1$ to $V_N$, respectively. Context-aware module 207 may assign N scalar weight values W ($W_1$, $W_2$, $W_3$, ... $W_i$, ... $W_N$), wherein the weight $W_i$ corresponds to the weight value of context-determination algorithm $C_i$. Context-aware module 207 may then sum $W_i \times V_i$ for i ranging from 1 to N to produce state vector <A, B, C> wherein A has a value associated with the state of the vehicle as in motion, B has a value associated with the state of the vehicle as stationary in traffic, and C has a value associated with the state of the vehicle as stationary in park. Context-aware module 207 may then determine the maximum value of A, B, and C; the state associated with the maximum of A, B, and C is the state of vehicle as determined by the context-aware module 207 in this embodiment.

Systems and methods in accordance with the present disclosure may also allow a driver to transfer their settings between one or more dashboard systems 100. For example, a dashboard system 100 regularly used by a driver may store the driver's settings (e.g., user customizations, downloaded apps, etc.) to cloud storage 130. If the driver uses another vehicle equipped with a dashboard system 100, the driver may log into the new dashboard system 100 using, for example, a login and password or other authentication. Dashboard system 100 may then load or synchronize the driver's settings, thereby providing the driver with the same virtual dashboard, applications, user customizations etc. as the dashboard system 100 regularly used by the driver. Thus, the driver is provided with a consistent driving experience, also improving safety. It is also envisioned that a dashboard system 100 may be transferred between vehicles, thus saving on manufacturing and purchasing costs.

What is claimed is:

1. A dashboard for a vehicle comprising:
   a primary display area;
   a secondary display area; and
   one or more hardware processors, wherein the one or more hardware processors are in communication with the primary display area and the secondary display area, and wherein the one or more hardware processors are configured to:
   (A) determine whether a predefined stationary location of the vehicle is satisfied, the predefined stationary location including an area with traffic and a parking lot, wherein the determination is made based on at least one of: a vehicle's engine state, a vehicle's speed, a proximity of the vehicle to a traffic signal junction; a proximity of the vehicle to the parking lot, or a vehicle's gear state;
   (B) receive a notification request containing a notification from an application being executed by the one or more hardware processors;
   (C) provide the notification using at least one of the primary display area or the secondary display area based on (I) the predefined stationary location of the vehicle being satisfied; (II) a categorization of the application; and (III) the application being one of a distracting or a non-distracting application, wherein a distracting application is provided in the secondary display area and a non-distracting application is provided in the primary display area; and
   (D) prioritize execution of the application by the one or more hardware processors based on the categorization of the application.

2. The dashboard according to claim 1, wherein determining whether the predefined stationary location of the vehicle is satisfied comprises using one or more context-determination algorithms executed on the one or more hardware processors.

3. The dashboard according to claim 2, wherein two or more context-determination algorithms are used and each context-determination algorithm individually determines whether predefined stationary location of the vehicle is satisfied based on at least one of a vehicle's engine state, a vehicle's speed, a proximity of the vehicle to a traffic signal junction; a proximity of the vehicle to the parking lot, or a vehicle's gear state; and
   wherein the one or more hardware processors are configured to determine whether predefined stationary location of the vehicle is satisfied by weighting the determination of each context-determination algorithm.

4. The dashboard according to claim 1, wherein the primary display area and the secondary display area are integrated into a single display device.

5. The dashboard according to claim 1, wherein the one or more hardware processors are further configured to receive input from a driver using one or more input devices, wherein the one or more input devices include at least one of: a touch-sensitive surface, a motion-sensing detector, a microphone, a keyboard, a touchscreen keyboard, or a pointing device.

6. The dashboard according to claim 5, wherein the one or more input devices include a microphone, and wherein the one or more hardware processors are further configured to process input from the microphone using a natural-language processing algorithm.

7. The dashboard according to claim 5, wherein the one or more hardware processors are further configured to disable one or more input devices when the vehicle is in motion.

8. The dashboard according to claim 1, wherein the one or more hardware processors are configured to determine whether predefined stationary location of the vehicle is satisfied using one or more on-board sensors, wherein the one or more on-board sensors include at least one of: an accelerometer, a gyroscope, a speedometer, and a GPS.

9. The dashboard according to claim 1, wherein the one or more hardware processors are configured to provide the notification using the primary display area when (I) the one or more hardware processors determine that the vehicle is in motion and (II) the application is categorized as a high priority application.

10. The dashboard according to claim 1, wherein the one or more hardware processors are configured to provide the notification using the secondary display area when (I) the one or more the one or more hardware processors determine that the vehicle is stationary in park and (II) the application is categorized as an intermediate or low priority application.

11. The dashboard according to claim 1, wherein the one or more hardware processors are further configured to:
    determine whether the application has been associated with the primary display area or the secondary display area; and
    save the association to a remote storage device when the application has been associated with the primary display area or the secondary display area.

12. The dashboard according to claim 11, wherein determining whether the application has been associated with the primary display area or secondary display area includes determining whether the association has been saved to the remote storage device.

13. A non-transitory computer-readable medium storing instructions for providing a dashboard for a vehicle having a primary display area and a secondary display area, wherein execution of the instructions by one or more hardware processors causes the one or more hardware processors to:
- (A) determine whether a predefined stationary location of the vehicle is satisfied, the predefined stationary location including an area with traffic and a parking lot, wherein the determination is made based on at least one of: a vehicle's engine state, a vehicle's speed, a proximity of the vehicle to a traffic signal junction; a proximity of the vehicle to the parking lot, or a vehicle's gear state;
- (B) receive a notification request containing a notification from an application being executed by the one or more hardware processors;
- (C) provide the notification using at least one of the primary display area or the secondary display area based on (I) the predefined stationary location of the vehicle being satisfied; (II) a categorization of the application; and (III) the application being one of a distracting or a non-distracting application, wherein a distracting application is provided in the secondary display area and a non-distracting application is provided in the primary display area; and
- (D) prioritize execution of the application by the one or more hardware processors based on the categorization of the application.

* * * * *